United States Patent
Hahn et al.

(10) Patent No.: US 10,020,122 B2
(45) Date of Patent: Jul. 10, 2018

(54) SYMMETRIC HYBRID SUPERCAPACITOR AND USE OF LIMNXFE1-XPO4 AS ELECTRODE MATERIAL FOR A HYBRID SUPERCAPACITOR

(71) Applicant: Robert Bosch GmbH, Stuttgart (DE)

(72) Inventors: Severin Hahn, Kirchheim unter Teck (DE); Elisabeth Buehler, Tamm (DE); Pallavi Verma, Leinfelden (DE)

(73) Assignee: Robert Bosch GmbH, Stuttgart (DE)

( * ) Notice: Subject to any disclaimer, the term of this patent is extended or adjusted under 35 U.S.C. 154(b) by 14 days.

(21) Appl. No.: 15/273,802

(22) Filed: Sep. 23, 2016

(65) Prior Publication Data

US 2017/0092439 A1    Mar. 30, 2017

(30) Foreign Application Priority Data

Sep. 25, 2015   (DE) .................. 10 2015 218 438

(51) Int. Cl.
| | | |
|---|---|---|
| *H01G 11/34* | (2013.01) | |
| *H01G 11/04* | (2013.01) | |
| *H01G 11/40* | (2013.01) | |
| *H01G 11/06* | (2013.01) | |
| *H01G 11/38* | (2013.01) | |
| *H01G 11/50* | (2013.01) | |
| *H01G 11/36* | (2013.01) | |

(52) U.S. Cl.
CPC ............. *H01G 11/34* (2013.01); *H01G 11/04* (2013.01); *H01G 11/06* (2013.01); *H01G 11/38* (2013.01); *H01G 11/40* (2013.01); *H01G 11/50* (2013.01); *H01G 11/36* (2013.01)

(58) Field of Classification Search
None
See application file for complete search history.

(56) References Cited

U.S. PATENT DOCUMENTS

| | | | | |
|---|---|---|---|---|
| 2010/0159346 A1* | 6/2010 | Hinago | ................. | H01G 9/016 429/479 |
| 2011/0049419 A1 | 3/2011 | Lee | | |
| 2011/0091771 A1* | 4/2011 | Sannan | ................. | C09D 5/002 429/217 |
| 2011/0235242 A1* | 9/2011 | Oh | ........................ | H01G 9/016 361/540 |
| 2011/0299223 A1* | 12/2011 | Oh | ........................ | H01G 11/04 361/502 |

(Continued)

OTHER PUBLICATIONS

Tan et al.; Highly energy density olivine cathode material synthesized by coprecipitation technique; Electrochimica Acta; Dec. 19, 2012; pp. 597-603; vol. 90; Elsevier, www.elsevier.com/locate/electacta.

*Primary Examiner* — Dion R Ferguson
(74) *Attorney, Agent, or Firm* — Walter Ottesen, P.A.

(57) ABSTRACT

A symmetric hybrid supercapacitor has two internally hybridized electrodes having both faradic and capacitatively active materials. More specifically, the symmetric hybrid supercapacitor has a cathode and an anode. The cathode contains $LiMn_xFe_{1-x}PO_4$. The $LiMn_xFe_{1-x}PO_4$ is used as electrode material for the hybrid supercapacitor. The condition applies that $0.1 < x < 0.9$.

11 Claims, 1 Drawing Sheet

(56) References Cited

U.S. PATENT DOCUMENTS

2012/0214068 A1* 8/2012 Dai .................. H01G 11/36
429/224
2013/0323585 A1* 12/2013 Inoue ................ H01G 11/68
429/211
2015/0084639 A1 3/2015 Joe

* cited by examiner

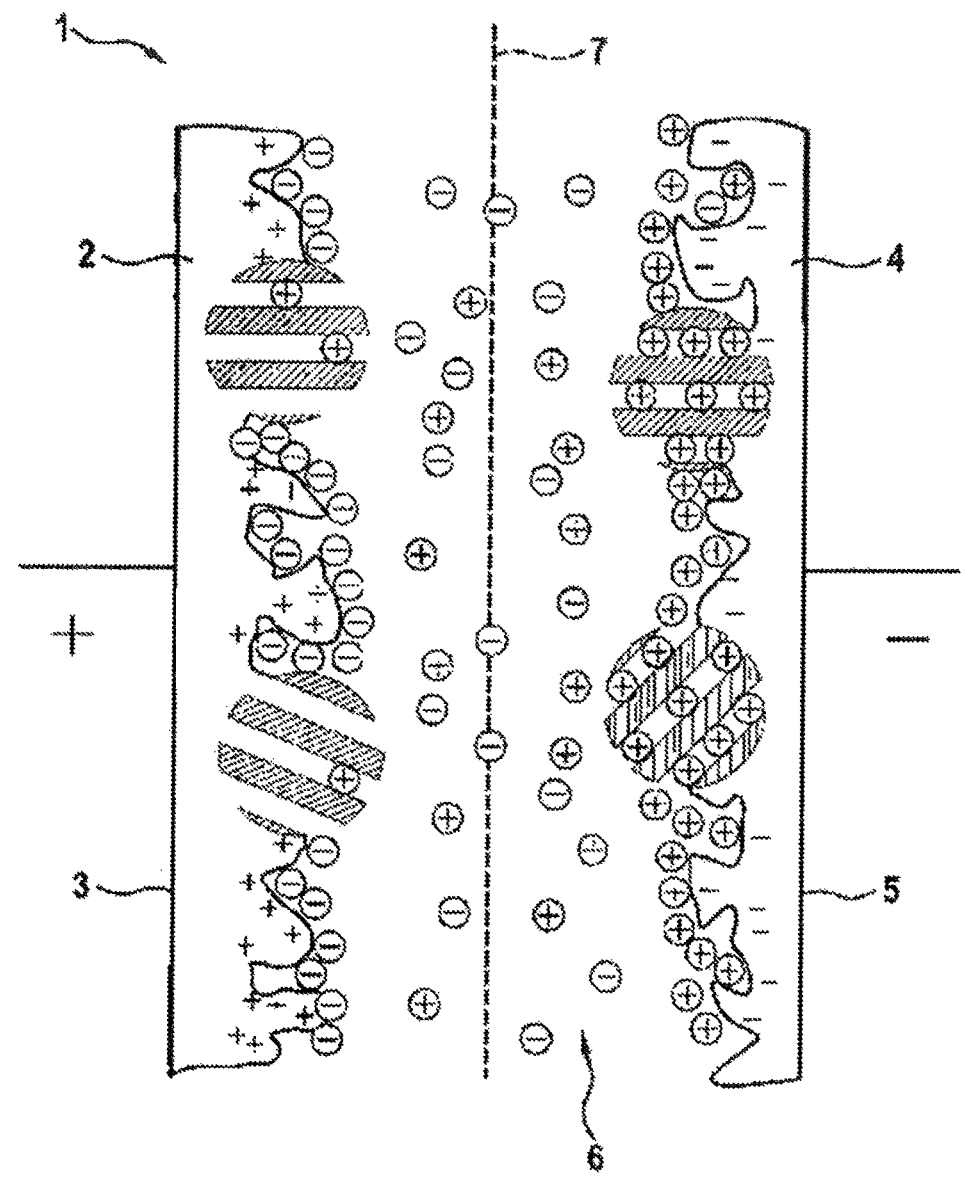

SYMMETRIC HYBRID SUPERCAPACITOR AND USE OF LIMNXFE1-XPO4 AS ELECTRODE MATERIAL FOR A HYBRID SUPERCAPACITOR

This application claims priority under 35 U.S.C. § 119 to patent application number DE 10 2015 218 438.2, filed on 25 Sep. 2015 in Germany, the disclosure of which is incorporated herein by reference in its entirety.

BACKGROUND

The present disclosure relates to a symmetric hybrid supercapacitor containing $LiMn_xFe_{1-x}PO_4$. The disclosure also relates to the use of $LiMn_xFe_{1-x}PO_4$ as electrode material for a hybrid supercapacitor. The condition applies that $0.1<x<0.9$.

Hybrid supercapacitors (HSCs), for example lithium ion capacitors, are a new generation of supercapacitors which can provide more power than lithium ion batteries. Although lithium ion batteries have a high energy density of more than 100 Wh/kg, they are able to release this energy only slowly. Hybrid supercapacitors have a higher energy density than supercapacitors (EDLCs/SCs), which are able to provide a power release of more than 100 kW/kg but have only a low energy density. Hybrid supercapacitors can be charged, for example, by means of short high-energy pulses as occur in the braking energy recuperation of motor vehicles. The electrical energy recovered in this way can subsequently be used to accelerate the motor vehicle. This enables saving of fuel and the reduction of carbon dioxide emissions. Hybrid supercapacitors are also being considered for use as an energy source in power tools. Since hybrid supercapacitors are a new technology compared to conventional supercapacitors and lithium ion batteries, only a few products are commercially available to date. Usually, in fields of application that would be suitable for hybrid supercapacitors, oversized lithium ion batteries are used, which, because of their size, are capable of providing the power required for the application in question.

Hybrid supercapacitors can be divided into two different categories according to the cell construction: symmetric and asymmetric hybrid supercapacitors. Asymmetric hybrid supercapacitors have an electrode, the material of which stores energy through reversible faradaic reaction. This may be a hybridized electrode. The second electrode is purely capacitative, meaning that it stores energy via the construction of a Helmholtz double layer. This construction is in common use particularly for first-generation hybrid supercapacitors, since it has an electrode configuration corresponding to the construction of lithium ion battery electrodes or supercapacitor electrodes, and so it is possible to utilize known electrode production methods. Lithium ion capacitors are one example of an asymmetric hybrid supercapacitor. Lithiated graphite or another form of a lithiatable carbon is used therein as anode. This enables a maximum voltage window of up to 4.3 V. However, SEI (solid electrolyte interface) formation at the anode is unavoidable in the case of use of anode materials having an intercalation potential close to 0 V vs. Li/Li$^+$, for example graphite. This is typically countered by specific cell modification, for example by electrolyte additives such as vinylene carbonate, in order to stabilize the SEI layer and prevent further electrolyte breakdown. The second type is symmetric hybrid supercapacitors consisting of two internally hybridized electrodes having both faradaic and capacitatively active materials. Through this combination, it is possible to considerably increase the power density of the hybrid supercapacitors compared to conventional lithium ion batteries or the energy density compared to conventional supercapacitors. In addition, it is possible to utilize synergistic effects between the two active electrode materials in the two electrodes. Carbon as an electrode constituent additionally enables faster provision of energy from the two electrodes, since it improves the electrical conductivity of the electrodes. High-porosity carbon can also function as a shock absorber for high currents. Symmetric hybrid supercapacitors are superior to asymmetric hybrid supercapacitors in pulsed operation.

The cathode of symmetric hybrid supercapacitors may contain $LiMn_2O_4$ or $LiFePO_4$. $LiMn_2O_4$ has a spinel structure and has a good voltage profile to fill the window of electrolyte stability with an intercalation plateau between 3.8 and 4.2 V versus Li/Li$^+$. Moreover, $LiMn_2O_4$ enables three-dimensional diffusion of lithium ions, which enables rapid charging and discharging of the hybrid supercapacitor. However, there is dissolution of manganese(II) cations over the lifetime, which limits the lifetime of the catalyst. Moreover, the spinel structure can be damaged by Jahn-Teller distortions at high charge depths. $LiFePO_4$ has an olivine structure. It can be produced from readily available and environmentally friendly materials and is known to be the safest cathode material in common use for lithium ion batteries. For a faradaic intercalation material, it additionally has a long lifetime. However, its intercalation plateau is 3.45 V versus Li/Li$^+$. Therefore, with $LiFePO_4$ as cathode material, it is not possible to fully exhaust the available voltage window of hybrid supercapacitors, and so it is not possible to achieve the maximum energy density possible for this capacitor type. Its low ion conductivity additionally limits the charging and discharging rate of the hybrid supercapacitor.

SUMMARY

The symmetric hybrid supercapacitor has an anode in addition to its cathode. It is preferable that the anode contains $Li_4Ti_5O_{12}$. This lithium titanate oxide has already been found to be useful as anode material for symmetric hybrid supercapacitors, and it has now been found that it can also be used advantageously in combination with a cathode containing $LiMn_xFe_{1-x}PO_4$. The $Li_4Ti_5O_{12}$ can, in the manner known in the prior art for the electrodes of symmetric hybrid supercapacitors, form a composite material with carbon. In order to achieve particularly favorable synergistic effects with the carbon, it is preferable that the composite material contains 20%-30% by weight of $Li_4Ti_5O_{12}$, especially in the form of $Li_4Ti_5O_{12}$ microparticles, and 70%-80% by weight of carbon. The sum total of these two components is 100% by weight.

The $LiMn_xFe_{1-x}PO_4$ preferably has an olivine structure. It thus has the same orthorhombic crystal structure as $LiFePO_4$, which has already been found to be suitable for cathode materials of symmetric hybrid supercapacitors.

In order to improve the formation of electrical contact of the $LiMn_xFe_{1-x}PO_4$ with further materials in the cathode, it is preferable that the $LiMn_xFe_{1-x}PO_4$ is in the form of carbon-coated particles.

To form a hybrid cathode, the $LiMn_xFe_{1-x}PO_4$, in the manner known for other cathode materials for symmetric hybrid supercapacitors, may form a composite material with carbon. In order to achieve the maximum possible degree of synergistic effects between the $LiMn_xFe_{1-x}PO_4$ and the carbon, it is preferable that the composite material contains 30%-40% by weight of $LiMn_xFe_{1-x}PO_4$, especially in the form of $LiMn_xFe_{1-x}PO_4$ microparticles, and 60%-70% by weight of carbon, where the sum total of these two components is 100% by weight. Microparticles are understood to mean particles having a number-average diameter of less than one micrometer.

The cathode may, in addition to the composite material, contain graphite and/or carbon black nanoparticles, in order to increase the electrical conductivity of the cathode. This effect is preferably achieved by virtue of the cathode containing 2%-10% by weight of graphite and/or carbon black nanoparticles based on 100% by weight of the composite material.

In addition, it is preferable that the cathode contains 2.5%-7.5% by weight of at least one binder based on 100% by weight of the composite material. The binder both improves the binding of the constituents of the cathode to one another and the binding of the cathode material to a collector of the symmetric hybrid supercapacitor. A particularly suitable binder is polytetrafluoroethylene (PTFE). This firstly has good binder properties and is secondly chemically inert.

The symmetric hybrid supercapacitor has an anode in addition to its cathode. It is preferable that the anode contains $Li_4Ti_5O_{12}$. This lithium titanate oxide has already been found to be useful as anode material for symmetric hybrid supercapacitors, and it has now been found that it can also be used advantageously in combination with a cathode containing $LiMn_xFe_{1-x}PO_4$. The $Li_4Ti_5O_{12}$ can, in the manner known in the prior art for the electrodes of symmetric hybrid supercapacitors, form a composite material which carbon. In order to achieve particularly favorable synergistic effects with the carbon, it is preferable that the composite material contains 20%-30% by weight of $Li_4Ti_5O_{12}$, especially in the form of $Li_4Ti_5O_{12}$ microparticles, and 70%-80% by weight of carbon. The sum total of these two components is 100% by weight.

The carbon in the composite material of the cathode and/or the composite material of the anode is preferably in a polymorph selected from the group consisting of carbon nanotubes, carbon nanofibers, graphene, functionalized graphene, activated carbon, and mixtures thereof. The carbon nanotubes may be single-wall nanotubes or multiwall nanotubes in which a plurality of single-wall nanotubes are arranged coaxially nested one inside another. The diameter of the carbon nanotubes is especially in the range of 1-3 nm. The carbon nanofibers may be spun to form flexible fabrics which especially have pores having a diameter of less than 2 nm. The high surface area of these carbon materials enables advantageous embedding of the $LiMn_xFe_{1-x}PO_4$ and/or the $Li_4Ti_5O_{12}$.

The use of $LiMn_xFe_{1-x}PO_4$ with $0.1<x<0.9$, preferably $0.3\leq x<0.9$, more preferably $0.5<x<0.9$, as electrode material for a hybrid supercapacitor enables improvement in the stability and electrical properties thereof compared to hybrid supercapacitors having electrode materials known from the prior art.

BRIEF DESCRIPTION OF THE DRAWINGS

The FIGURE shows, in schematic form, the construction of a symmetric hybrid supercapacitor according to a working example of the disclosure.

DETAILED DESCRIPTION

A hybrid supercapacitor 1 according to the working example of the disclosure has the construction shown in the FIGURE. A cathode 2 has been applied to a first collector 3. An anode 4 has been applied to a second collector 5. An electrolyte 6 is accommodated between the cathode 2 and the anode 4. A separator 7 separates the cathode 2 from the anode 4. Embedding of $Li^+$ ions into the cathode 2 and into the anode 4 is shown schematically in the FIGURE in four enlargements.

For production of the cathode, a mixture of 58 g of activated carbon, 30 g of carbon-coated $LiMn_{0.6}Fe_{0.4}PO_4$ microparticles having olivine structure and 5 g of graphite is first produced. This is dry-mixed at 1000 rpm for 10 min. Then 90 ml of isopropanol are added and the suspension obtained is first stirred at 2500 rpm for 2 min, then treated with ultrasound for 5 min and subsequently stirred once again at 2500 rpm for 4 min. Thereafter, 7 g of polytetrafluoroethylene as binder are added to the suspension and the mixture is stirred once again at 800 rpm for 5 min until the suspension assumes a pasty consistency. The paste is rolled out on a glass plate to give a cathode 2 of thickness 150 μm, which is then applied to the first collector 3.

For production of the anode, a mixture of 66 g of activated carbon, 22 g of $Li_4Ti_5O_{12}$ microparticles and 5 g of carbon black nanoparticles is first produced. This is dry-mixed at 1000 rpm for 10 minutes. Then 90 ml of isopropanol are added and the suspension obtained is first stirred at 2500 rpm for 2 min, then treated with ultrasound for 5 min and subsequently stirred once again at 2500 rpm for 4 min. Thereafter, 7 g of polytetrafluoroethylene as binder are added to the suspension and the mixture is stirred once again at 800 rpm for 5 min until the suspension assumes a pasty consistency. The paste is rolled out on a glass plate to give an anode 3 of thickness 150 μm, which is then applied to the second collector 4.

The electrolyte 6 used is a 1 M solution of $LiClO_4$ in acetonitrile. The separator 7 consists of a porous aramid fabric.

The partial exchange of manganese atoms for iron atoms in the olivine crystal structure leads to an increased intercalation voltage of the cathode. In the solid-state cyclic voltammogram of the electrode, by the method described in M. G. Theivanayagam, Thesis, The University of Texas, Austin, Tex. USA, 2010, a voltage plateau for manganese at 4 V versus $Li/Li^+$ can be determined. While the voltage plateau for iron for cathode materials containing $LiFePO_4$ is 3.45 V versus $Li/Li^+$, it increases with increasing exchange of iron atoms for manganese atoms to 3.55 V versus $Li/Li^+$ for $LiMn_xFe_{1-x}PO_4$ with $0.5<x<0.9$. This leads to an improved energy density and a higher cell voltage of the hybrid supercapacitor according to the present working example of the disclosure compared to $LiFePO_4$, which corresponds to $LiMn_xFe_{1-x}PO_4$ with $x=0$.

According to the method of analysis which is described in Z. Tan, X. Wang, H. Zhou, Electrochimica Acta 2013, 90, 597-603, it is possible to show that $LiMn_xFe_{1-x}PO_4$ with $x\geq 0.3$ has a slower release of $Mn^{2+}$ ions than $LiMn_2O_4$. The iron atoms thus prevent release of $Mn^{2+}$ ions into the electrolyte.

What is claimed is:

1. A symmetric hybrid supercapacitor, comprising:
   a cathode comprising $LiMn_xFe_{1-x}PO_4$,
   wherein $0.1<x<0.9$,
   wherein the $LiMn_xFe_{1-x}PO_4$ forms a composite material with carbon, and
   wherein the composite material contains 30%-40% by weight of $LiMn_xFe_{1-x}PO_4$ and 60%-70% by weight of carbon.

2. The symmetric hybrid supercapacitor according to claim 1, wherein 0.3≤x<0.9.

3. The symmetric hybrid supercapacitor according to claim 1, wherein the $LiMn_xFe_{1-x}PO_4$ is in the form of carbon-coated particles.

4. The symmetric hybrid supercapacitor according to claim 1, wherein the cathode further comprises 2.5 wt % to 7.5 wt % polytetrafluoroethylene (PTFE) by weight of $LiMn_xFe_{1-x}PO_4$.

5. The symmetric hybrid supercapacitor according to claim 1, wherein:
the cathode contains 2%-10% by weight further graphite and/or carbon black nanoparticles based on 100% by weight of the composite material.

6. The symmetric hybrid supercapacitor according to claim 1, wherein
the cathode contains 2.5%-7.5% by weight of at least one binder based on 100% by weight of the composite material.

7. A symmetric hybrid supercapacitor, comprising:
a cathode comprising $LiMn_xFe_{1-x}PO_4$, and
an anode containing $Li_4Ti_5O_{12}$,
wherein 0.1<x<0.9.

8. The symmetric hybrid supercapacitor according to claim 7, wherein
the $Li_4Ti_5O_{12}$ forms a composite material with carbon, and
the composite material contains 20%-30% by weight of $Li_4Ti_5O_{12}$ and 70%-80% by weight of carbon.

9. The symmetric hybrid supercapacitor according to claim 1, wherein the carbon is in a polymorph selected from the group consisting of carbon nanotubes, carbon nanofibers, graphene, functionalized graphene, activated carbon, and mixtures thereof.

10. A method of of manufacturing a symmetric hybrid supercapacitor, which comprises:
providing $LiMn_xFe_{1-x}PO_4$, and
incorporating the $LiMn_xFe_{1-x}PO_4$ into an electrode,
wherein 0.1<x<0.9,
wherein the $LiMn_xFe_{1-x}PO_4$ forms a composite material with carbon, and
wherein the composite material contains 30%-40% by weight of $LiMn_xFe_{1-x}PO_4$ and 60%-70% by weight of carbon.

11. The method according to claim 10, wherein the electrode is a cathode that further comprises 2.5 wt % to 7.5 wt % polytetrafluoroethylene (PTFE) by weight of $LiMn_xFe_{1-x}PO_4$.

* * * * *

UNITED STATES PATENT AND TRADEMARK OFFICE
CERTIFICATE OF CORRECTION

PATENT NO. : 10,020,122 B2
APPLICATION NO. : 15/273802
DATED : July 10, 2018
INVENTOR(S) : S. Hahn et al.

It is certified that error appears in the above-identified patent and that said Letters Patent is hereby corrected as shown below:

In the Specification

In Column 2:
Line 39-53: delete "Lines 39 to 53" and substitute -- The hybrid supercapacitor of the disclosure is designed as a symmetric hybrid supercapacitor. It has a cathode containing $LiMn_xFe_{1-x}PO_4$ where $0.1 < x < 0.9$. Preferably, $x \geq 0.3$; more preferably, $x > 0.5$. This lithium manganese iron phosphate (LMFP) releases fewer manganese (II) ions into the electrolyte of the hybrid supercapacitor than $LiMn_2O_4$. It has a higher Fe voltage plateau than $LiFePO_4$. The symmetric hybrid supercapacitor of the disclosure therefor attains a longer lifetime and has a higher energy density than hybrid supercapacitors wherein the cathode contains $LiMn_2O_4$ or $LiFePO_4$. $LiMn_xFe_{1-x}PO_4$ is already being used as an electrode material for lithium ion batteries. It is therefore commercially available in large volumes. -- therefor.

In Column 3:
Line 30: delete "form a composite material which" and substitute -- form a composite material with -- therefor.

In the Claims

In Column 6:
Line 10: Claim 10 delete "A method of of manufacturing" and substitute -- A method of manufacturing -- therefor.

Signed and Sealed this
Twenty-first Day of May, 2019

Andrei Iancu
*Director of the United States Patent and Trademark Office*